United States Patent
Lee et al.

(10) Patent No.: US 10,953,577 B2
(45) Date of Patent: Mar. 23, 2021

(54) VEHICULAR HYBRID SUSPENSION ARM AND MANUFACTURING METHOD THEREOF

(71) Applicant: ILJIN CO., LTD., Gyeongju-si (KR)

(72) Inventors: Sung Keun Lee, Seoul (KR); Hyun Woo Kim, Guri-si (KR); Tae Sung Kwon, Gyeongju-si (KR); Byong Suk Yu, Gyeongju-si (KR); Se Woong Jeong, Ulsan (KR); Hyuk Kwon, Seoul (KR); Ig Jin Kwon, Gyeongju-si (KR); Young In Yoon, Ulsan (KR); Min Kook Park, Daegu (KR); Soon Chan Kwon, Gimcheon-si (KR); Dae Ju Lee, Daegu (KR)

(73) Assignee: ILJIN CO., LTD., Gyeongju-si (KR)

( * ) Notice: Subject to any disclaimer, the term of this patent is extended or adjusted under 35 U.S.C. 154(b) by 84 days.

(21) Appl. No.: 16/066,930

(22) PCT Filed: Dec. 29, 2016

(86) PCT No.: PCT/KR2016/015512
§ 371 (c)(1),
(2) Date: Jun. 28, 2018

(87) PCT Pub. No.: WO2017/116182
PCT Pub. Date: Jul. 6, 2017

(65) Prior Publication Data
US 2019/0061452 A1 Feb. 28, 2019

(30) Foreign Application Priority Data

| Dec. 30, 2015 | (KR) | 10-2015-0189881 |
| Nov. 2, 2016 | (KR) | 10-2016-0145446 |
| Dec. 9, 2016 | (KR) | 10-2016-0167842 |

(51) Int. Cl.
*B29C 45/14* (2006.01)
*F16C 11/06* (2006.01)
(Continued)

(52) U.S. Cl.
CPC ........ *B29C 45/14* (2013.01); *B29C 45/14344* (2013.01); *B60G 7/001* (2013.01);
(Continued)

(58) Field of Classification Search
CPC .............. B29C 45/14; B29C 45/14344; B29C 45/14467; B60G 7/005; B60G 7/001;
(Continued)

(56) References Cited

U.S. PATENT DOCUMENTS

| 5,662,348 A | 9/1997 | Kusama et al. |
| 5,992,867 A * | 11/1999 | Kato ........................ B60G 3/06 |
| | | 280/124.134 |

(Continued)

FOREIGN PATENT DOCUMENTS

| EP | 1223058 | 7/2002 |
| JP | 08-197923 | 8/1996 |

(Continued)

OTHER PUBLICATIONS

International Search Report, issued in the corresponding PCT Application No. PCT/KR2016/015512, dated Jun. 21, 2017, 5 pages.

(Continued)

*Primary Examiner* — Darlene P Condra
(74) *Attorney, Agent, or Firm* — Hamre, Schumann, Mueller & Larson, P.C.

(57) ABSTRACT

A vehicular hybrid suspension arm includes a suspension arm body made of a steel material, and an insert molding (Continued)

inserted into and coupled to the suspension arm body, providing a suspension arm having reduced weight and high rigidity.

13 Claims, 16 Drawing Sheets

(51) Int. Cl.
  *B60G 7/00* (2006.01)
  *B29L 31/30* (2006.01)
(52) U.S. Cl.
  CPC .............. *B60G 7/005* (2013.01); *F16C 11/06* (2013.01); *B29L 2031/30* (2013.01); *B60G 2204/143* (2013.01); *B60G 2204/148* (2013.01); *B60G 2204/41* (2013.01); *B60G 2204/416* (2013.01); *B60G 2204/418* (2013.01); *B60G 2206/014* (2013.01); *B60G 2206/12* (2013.01); *B60G 2206/122* (2013.01); *B60G 2206/124* (2013.01); *B60G 2206/7102* (2013.01); *B60G 2206/7104* (2013.01); *B60G 2206/72* (2013.01); *B60G 2206/73* (2013.01); *B60G 2206/81012* (2013.01); *B60G 2206/91* (2013.01)
(58) Field of Classification Search
  CPC ........ B60G 2204/143; B60G 2204/148; B60G 2204/41; B60G 2204/416; B60G 2204/418; B60G 2206/12; B60G 2206/73; B60G 2206/014; B60G 2206/122; B60G 2206/124; B60G 2206/7102; B60G 2206/7104; B60G 2206/72; B60G 2206/81012; B60G 2206/91; B60G 2206/80; B60G 2206/8201; F16C 11/06; F16C 11/0619; F16C 11/0633; F16C 2326/05; B29L 2031/30
  See application file for complete search history.

(56) References Cited

U.S. PATENT DOCUMENTS

| | | | |
|---|---|---|---|
| 7,938,417 B2 | 5/2011 | Ersoy et al. | |
| 2006/0175786 A1* | 8/2006 | Streubel | B60G 7/001 |
| | | | 280/124.134 |
| 2010/0084834 A1 | 4/2010 | Ersoy et al. | |
| 2010/0086346 A1* | 4/2010 | Kruse | B60G 7/001 |
| | | | 403/122 |
| 2011/0133421 A1 | 6/2011 | Jeong | |
| 2011/0133423 A1 | 6/2011 | Jeong | |
| 2011/0133425 A1 | 6/2011 | Jeong | |
| 2012/0315414 A1 | 12/2012 | Wesch et al. | |
| 2013/0205591 A1* | 8/2013 | Santini | B29D 24/002 |
| | | | 29/897.2 |
| 2018/0154718 A1 | 6/2018 | Kwon et al. | |
| 2019/0315173 A1* | 10/2019 | Kim | B60G 7/001 |
| 2019/0315174 A1* | 10/2019 | Kwon | B60G 3/02 |

FOREIGN PATENT DOCUMENTS

| | | |
|---|---|---|
| JP | H08197923 A | 8/1996 |
| JP | 08-318722 | 12/1996 |
| JP | 11-115800 | 4/1999 |
| JP | 2002-205520 | 7/2002 |
| JP | 2011-116336 A | 6/2011 |
| JP | 2011-116340 A | 6/2011 |
| JP | 2011-116342 A | 6/2011 |
| JP | 2011116336 A | 6/2011 |
| JP | 2011116340 A | 6/2011 |
| JP | 2011116342 A | 6/2011 |
| JP | 2018-514463 A | 6/2018 |
| JP | 2018514463 A | 6/2018 |
| KR | 10-1393849 | 5/2004 |
| KR | 10-2009-0122978 | 12/2009 |
| KR | 1020090122978 A | 12/2009 |
| KR | 10-2010-0112846 | 10/2010 |
| KR | 10-2010-0116081 | 10/2010 |
| KR | 10-2011-0063166 | 6/2011 |
| KR | 10-2012-0105470 | 9/2012 |
| KR | 10-1211419 | 12/2012 |
| KR | 10-2013-0036808 | 4/2013 |
| KR | 1020130036808 A | 4/2013 |
| KR | 101393849 B1 | 5/2014 |

OTHER PUBLICATIONS

The extended European search report issued in European Application No. 16882134.6, dated Aug. 6, 2019, 8 pages provided.

* cited by examiner

VEHICULAR HYBRID SUSPENSION ARM AND MANUFACTURING METHOD THEREOF

TECHNICAL FIELD

The present disclosure relates to a suspension arm of a vehicular suspension system. More particularly, the present disclosure relates to a vehicular hybrid suspension arm in which a vehicular suspension arm such as an upper control arm and a lower control arm is made of a composite material of plastic and steel, and a manufacturing method thereof.

BACKGROUND

A vehicular suspension system is an apparatus which connects a wheel to a vehicular body. The vehicular suspension system includes a spring which absorbs vibration or impact transmitted from a road surface to a vehicular body, a shock absorber which adjusts an action of the spring, and a suspension arm or suspension link which controls an operation of the wheel.

By way of example, types of suspension systems for controlling the operation of a vehicular wheel include a swing arm type, a wishbone type, a McPherson strut type or the like. A suspension system using a wishbone type control includes a suspension arm (lower control arm) which connects a knuckle fastened to a vehicular wheel to a vehicular body. That is, one end of the suspension arm is connected to a cross member or a subframe which constitutes the vehicular body, while the other end of the suspension arm is connected to the knuckle via a ball joint. With this configuration, the suspension arm allows the vehicular wheel to be supported by the vehicular body, and appropriately controls the toe-in of the vehicular wheel in accordance with the running status of a vehicle, thereby improving the straight running performance and the steering stability of the vehicle.

The suspension arm has been manufactured in a casting type method and a press type method. Specifically, according to the casting type method, the suspension arm is manufactured by being molded by pouring molten steel or molten aluminum into a metal mold and then solidifying the molten steel or aluminum. Further, according to the press type method, the suspension arm is manufactured by fabricating an upper plate and a lower plate from a steel plate made of a steel material by a press, and welding the upper plate and the lower plate.

In the suspension arm manufacturing method, the suspension arm is fabricated from a steel casting, or the upper and lower plates are fabricated from a steel material by a press method and the upper and lower plates are welded thereafter. The foregoing methods are problematic since the weight of the suspension arm is heavy due to the characteristics of steel, a lot of manufacturing processes are required, and rigidity weakness and deformation may occur due to the welding of the steel plates.

SUMMARY

Various embodiments of the present disclosure propose a vehicular hybrid suspension arm made of a composite material to solve the problems of the steel-made suspension arm and to achieve weight reduction.

Further, various embodiments of the present disclosure increase the rigidity of a vehicular hybrid suspension arm, prevents the strength decrease caused by the injection weld line of a plastic molding, and reduces the possibility of corrosion.

A vehicular hybrid suspension arm according to one embodiment may include: a suspension arm body made of a steel material; an insert molding inserted into and coupled to the suspension arm body and made of a plastic material; and a coupling portion in which the suspension arm body and a portion of the insert molding intersect with each other to prevent separation between the suspension arm body and the insert molding.

The coupling portion may include a flange structure. The flange means may include: a coupling flange formed to be bent inward in a width direction of the suspension arm body; and a fixing portion which is a portion of the insert molding and into which the coupling flange is inserted.

The coupling portion may include a reinforcement structure. The reinforcement structure may include a reinforcement member which is inserted into and fixed to the suspension arm body and is in contact with the insert molding.

The reinforcement member may be disposed in a cross-sectional direction of the suspension arm body, and the insert molding may surround the reinforcement member.

At least one hole may be formed in the reinforcement member, and the insert molding may extend through the hole.

The reinforcement member may be disposed in a direction parallel to the suspension arm body, and a portion of the insert molding may be inserted into and coupled to the reinforcement member.

A distal end of the reinforcement member may be formed to be bent inward in a width direction of the reinforcement member.

The coupling portion may include a button structure. The button structure may include: one or more holes formed in the suspension arm body; and one or more buttons which are formed from the insert molding and are inserted into and fill in the one or more holes. The buttons may be enlarged up to peripheral edges of the one or more holes.

A vehicular hybrid suspension arm according to another embodiment may include: a suspension arm body made of a steel material; and an insert molding inserted into and coupled to the suspension arm body. A coupling flange may be formed in the suspension arm body so as to be bent inward in a width direction of the suspension arm body, and the coupling flange may be inserted into and coupled to the insert molding.

The suspension arm body may include two leg portions and a joint portion integrally connecting the two leg portions.

Bush pipes may be coupled to leading end portions of the two leg portions by welding, and a ball joint pipe may be coupled to a leading end portion of the joint portion by welding.

The ball joint pipe may be located at a central portion between the bush pipes. The bush pipes may be disposed so as to be opened in a horizontal direction, and the ball joint pipe may be disposed so as to be opened in a vertical direction.

A bush may be force-fitted into and coupled to each of the bush pipes, and a ball joint may be force-fitted into and coupled to the ball joint pipe.

One or more holes may be formed through the suspension arm body. One or more buttons, which are inserted into and fill in the one or more holes and are enlarged up to peripheral edges of the one or more holes, may be formed in the insert molding.

The suspension arm body may include two leg portions and a joint portion integrally connecting the two leg portions. The insert molding may include two leg portions and a joint portion integrally connecting the two leg portions. The one or more holes may include one or more small-diameter holes which are disposed at predetermined spacings along a longitudinal direction in each of the two leg portions. The one or more buttons may be inserted into and fill in the one or more small-diameter holes and may be formed in such a size that the one or more buttons are radially enlarged up to peripheral edges of the one or more small-diameter holes.

The one or more small-diameter holes may include two or more small-diameter holes disposed adjacent to each other. One or more middle-diameter holes having a relatively large diameter may be formed between the two or more small-diameter holes. A portion of the insert molding may be inserted into the middle-diameter holes such that a middle-diameter coupling rims radially enlarged up to peripheral edges of the middle-diameter holes are formed in the insert molding.

The one or more coupling holes may include a large-diameter hole formed in the joint portion of the suspension arm body. A portion of the insert molding may be inserted into the large-diameter hole such that a large-diameter coupling rim radially enlarged up to a peripheral edge of the large-diameter hole is formed in the insert molding.

One or more reinforcement ribs having a lattice-patterned shape may be protrudingly formed integrally with the insert molding.

The suspension arm body may include two leg portions.

A bush coupling protrusion portion having a pipe shape may be integrally formed with one of the two leg portions, and the insert molding may be inserted into and coupled to the bush coupling protrusion portion.

The insert molding may be coupled to the other of the two leg portions by injection, and a ball joint may be inserted into and integrally coupled to a coupling leading end portion of the insert molding by injection.

A large-diameter hole may be formed in the suspension arm body, and a bush may be force-fitted into and coupled to the large-diameter hole.

The large-diameter hole may be formed in one side surface of the suspension arm body between the bush coupling protrusion portion and the ball joint.

One or more middle-diameter holes may be formed in the suspension arm body, and one or more buttons may be formed in the insert molding in such a manner that the buttons fill in the middle-diameter holes and are radially enlarged up to peripheral edges of the middle-diameter holes.

One or more small-diameter holes may be formed in the suspension arm body, and one or more small-diameter coupling rims may be formed in the insert molding so as to be radially enlarged up to peripheral edges of the small-diameter holes.

The insert molding may be coupled to one of the two leg portions by injection, and a ball joint may be inserted into and integrally coupled to a coupling leading end portion of the insert molding by injection.

A large-diameter bush coupling hole may be formed at a leading end portion of the other of the two leg portions, and a bush may be force-fitted into and coupled to the large-diameter bush coupling hole.

A bush pipe may be integrally coupled to a corner where the two leg portions meet The bush pipe may be disposed between the ball joint and the large-diameter bush coupling hole.

A middle-diameter hole may be formed in one of the two leg portions, and a middle-diameter hole flange bent toward the inside of the insert molding may be provided in the suspension arm body.

One or more small-diameter holes may be formed in the two leg portions, and one or more buttons may be formed in the insert molding in such a manner that the buttons fill in the one or more small-diameter holes and are radially enlarged up to peripheral edges of the small-diameter holes.

The one or more buttons may be formed in a circular or polygonal shape.

A method of manufacturing a vehicular hybrid suspension arm according to a further embodiment may include: fabricating a ball stud by using a steel material; fabricating a ball bearing by using plastic; coupling the ball bearing to the ball stud; fabricating a suspension arm body by using a steel plate; attaching bush pipes and a ball joint pipe to the suspension arm body; assembling the ball joint pipe and an assembly of the ball stud and the ball bearing by force-fitting the assembly of the ball stud and the ball bearing into the ball joint pipe; coupling the suspension arm body and the insert molding by inserting the suspension arm body into a metal mold and injecting a plastic resin; assembling bushes and the bush pipes by force-fitting the bushes into the bush pipes; and covering the ball stud by a dust cover and fixing the dust cover by a ring clip.

Lubricant may be injected into the ball bearing.

A vehicular hybrid suspension arm according to one embodiment may include: a suspension arm body; an insert molding inserted into the suspension arm body; and a reinforcement member positioned inside the suspension arm body and being in contact with the insert molding.

The reinforcement member may be disposed along a longitudinal direction of the suspension arm body.

The reinforcement member may have a plate shape.

The reinforcement member may include at least two plates connected to each other.

At least a portion of the reinforcement member may have a bent shape.

At least a portion of the reinforcement member may be embedded by the insert molding.

At least one hole may be formed in the reinforcement member.

The suspension arm body may include an upper surface and a side surface extending from the upper surface. One surface of the reinforcement member may be in contact with the upper surface of the suspension arm body, and the other surface of the reinforcement member may be in contact with the side surface of the suspension arm body.

A center hole may be formed in the upper surface of the suspension arm body at a middle section when an entire length of the suspension arm body is trisected.

At least one recess portion may be formed in the upper surface of the suspension arm body.

At least one through hole may be formed in the recess portion.

The suspension arm body may include two leg portions integrally formed with each other. A ball joint may be coupled to a leading end portion of one of the two leg portions, and a bush hole may be formed at a leading end portion of the other of the two leg portions.

The reinforcement member may be disposed to extend over a portion of one of the two leg portions and a portion of the other of the two leg portions.

A bush pipe may be integrally coupled to an opposite leading end of the leg portion to which the ball joint is coupled.

A plurality of holes may be formed in the upper surface of the suspension arm body. The plurality of holes formed in the leg portion to which the ball joint is coupled may be equal to or smaller in number to the plurality of holes formed in the other leg portion.

Some of the plurality of holes may be disposed in a portion adjacent to the bush hole or the ball joint.

The insert molding may include a reinforcement rib formed in at least a portion of at least one of the two leg portions.

The reinforcement rib may be disposed in one of the two leg portions.

According to one embodiment of the present disclosure, the suspension arm body made of a steel material is provided at the outer side, while the insert molding is disposed at the inner side. Thus, the section modulus of the steel-made suspension arm body can be sufficiently ensured, thereby increasing the rigidity.

Further, unnecessary portions that do not affect the rigidity are removed from the insert molding. Thus, the weld line of an injected article is reduced and the occurrence of cracks in the insert molding is suppressed as far as possible, thereby increasing rigidity and improving durability.

Further, due to the reduction in weight and the increase in rigidity in the hybrid-type suspension arm, the ride quality and the steering stability of the vehicle can be improved.

DETAILED DESCRIPTION

Figure 1:
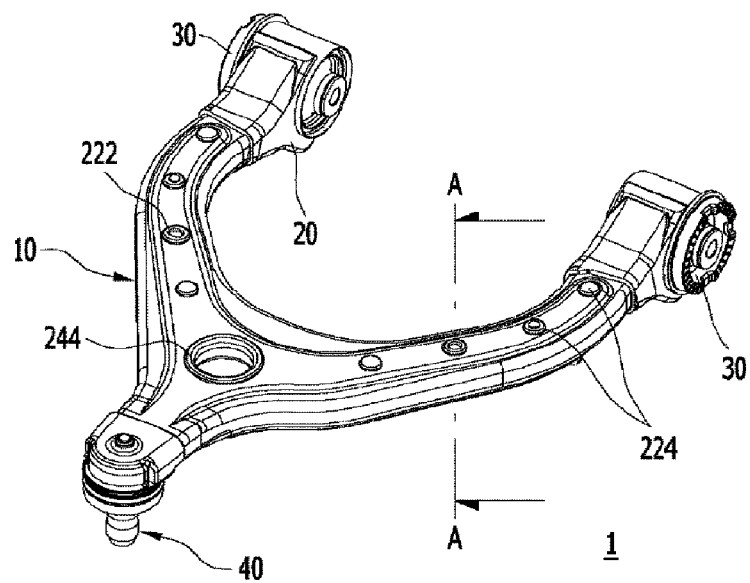
FIG. 1 is a perspective view of a vehicular hybrid suspension arm manufactured by a manufacturing method according to one embodiment of the present disclosure.

Embodiments of the present disclosure are illustrated for the purpose of explaining the technical idea of the present disclosure. The scope of the rights according to the present disclosure is not limited to the embodiments presented below or the detailed descriptions of such embodiments.

All technical and scientific terms used in the present disclosure have the meaning generally understood by those of ordinary skill in the art to which the present disclosure pertains, unless otherwise defined. All terms used in the present disclosure are chosen for the purpose of more clearly describing the present disclosure and are not chosen to limit the scope of rights according to the present disclosure.

As used in the present disclosure, expressions such as "comprising", "including", "having", and the like are to be understood as open-ended terms having the possibility of encompassing other embodiments, unless otherwise mentioned in the phrase or sentence containing such expressions.

The singular form described in the present disclosure may include a plural meaning, unless otherwise mentioned. This applies equally to the singular form recited in the claims.

In the present disclosure, where it is mentioned in the present disclosure that one element is "connected" to another element, it is to be understood that said one element may be directly connected to said another element, or may be connected to said another element via a new additional element.

Hereinafter, descriptions are made as to embodiments of the present disclosure with reference to the accompanying drawings. In the accompanying drawings, the same or corresponding elements are denoted by the same reference numerals. In the following descriptions of the embodiments, descriptions of the same or corresponding elements may be omitted. However, even if the descriptions of elements are omitted, it is not intended that such elements are not included in a certain embodiment.

Figure 2:
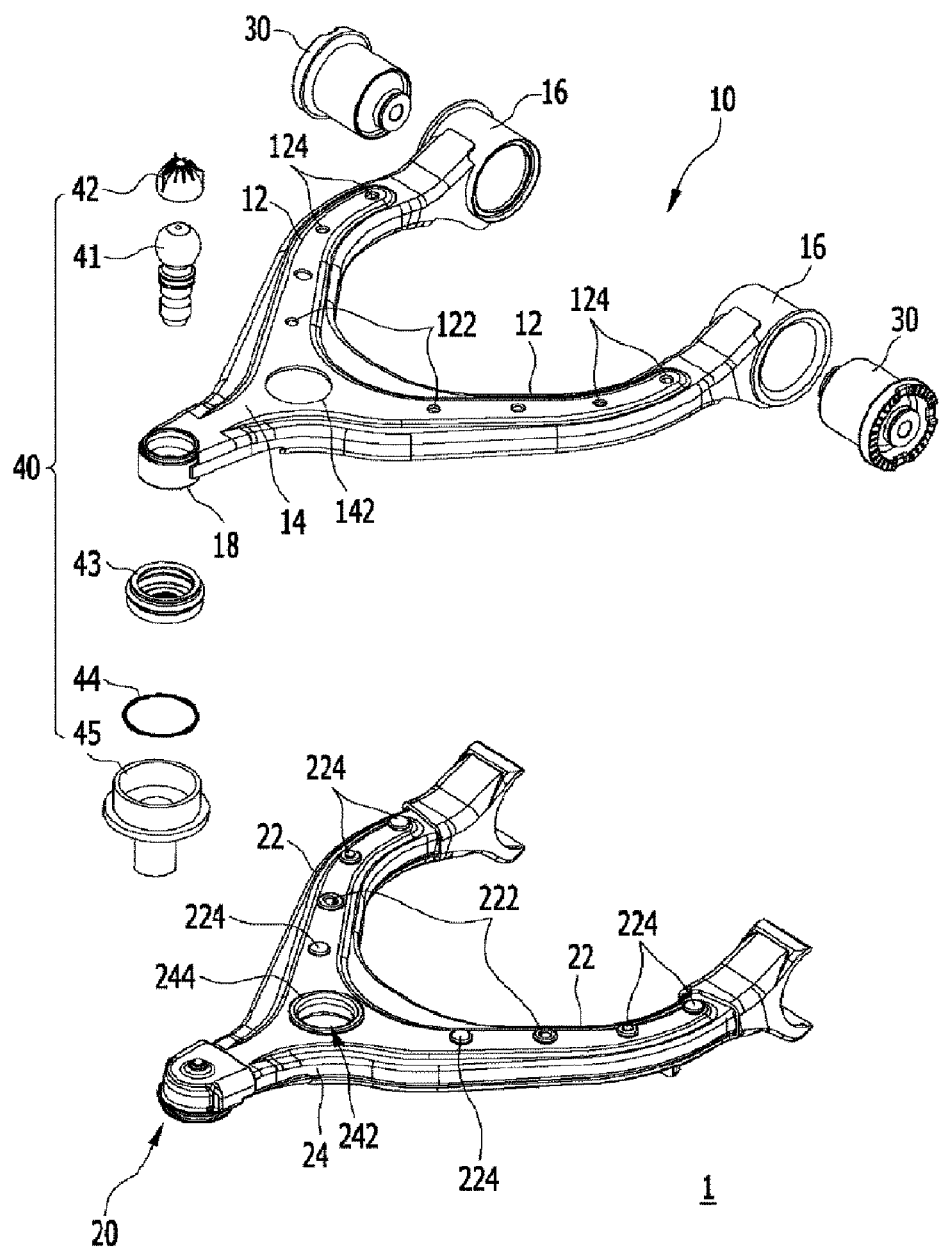
FIG. 2 is an exploded perspective view of the vehicular hybrid suspension arm manufactured by the manufacturing method according to one embodiment of the present disclosure.

FIG. 1 is a perspective view of a vehicular hybrid suspension arm 1 manufactured by a manufacturing method according to one embodiment of the present disclosure, and FIG. 2 is an exploded perspective view of the suspension arm 1 shown in FIG. 1.

The vehicular hybrid suspension arm 1 may include a suspension arm body 10 which can be fabricated from a high tensile steel plate for a vehicle through a general press method.

The suspension arm body 10 may have a shape such as, for example, a U-like shape. The U-shaped suspension arm body 10 may be used as, for example, an upper control arm of a suspension system, but is not necessarily limited thereto.

The suspension arm body 10 may include two leg portions 12 and a joint portion 14 integrally connecting the two leg portions 12. A bush pipe 16 may be coupled to each of leading end portions of the two leg portions 12 by welding, and a ball joint pipe 18 may be coupled to a leading end portion of the joint portion 14 by welding.

Specifically, a generally semi-cylindrical coupling hole is formed at the leading end portion of the joint portion 14, and each of the pipes 16, 18 is disposed to fit into the coupling hole. Each of the pipes 16, 18 and the coupling hole may be coupled together by welding.

The ball joint pipe 18 may be located in a central portion between the bush pipes 16. The bush pipes 16 may be disposed to be opened in the horizontal direction, while the ball joint pipe 18 may be disposed to be opened in the vertical direction.

Bushes 30 may be force-fitted into the respective two bush pipes 16. The respective bushes 30 may be fastened to a vehicular body with a bolt or the like.

Figure 5:
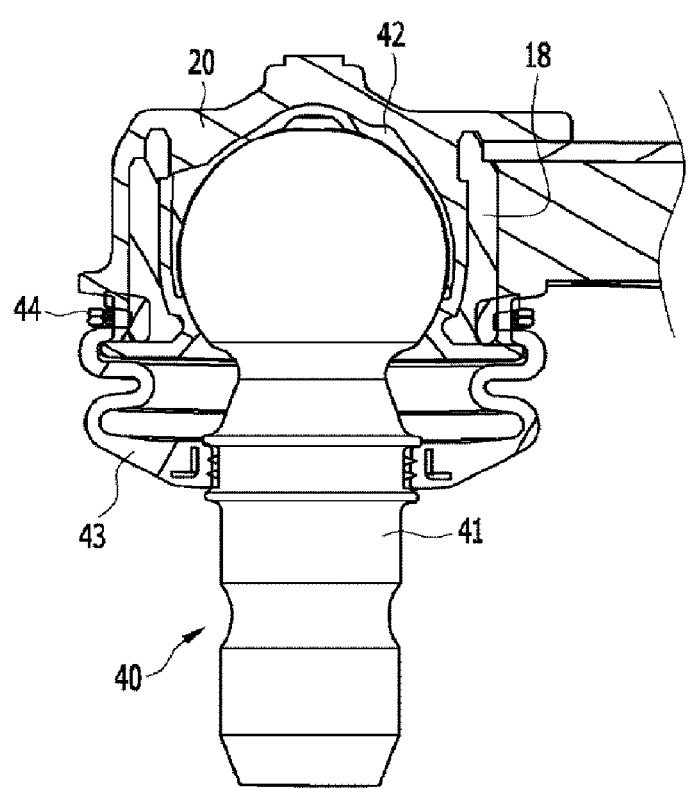
FIG. 5 is a sectional view of a ball joint of a vehicular hybrid suspension arm according to one embodiment of the present disclosure.

A ball joint 40 may be force-fitted into the ball joint pipe 18. The specific structure of the ball joint 40 is shown in FIGS. 1 and 5.

The ball joint 40 may include: a ball stud 41; a ball bearing 42 which surrounds and rotatably supports the ball stud; a dust cover 43 which surrounds the ball stud 41 to prevent intrusion of foreign matter; a ring clip 44 for assembling the dust cover 43 to the ball stud 41; and a protector 45 covered on the ball stud 41 from the opposite side of the ball bearing 42.

A large-diameter hole 142 having a relatively large diameter may be formed through the joint portion 14. A plurality of middle-diameter holes 122 and a plurality of small-diameter holes 124 may be disposed in each leg portion 12 with predetermined spacings along a longitudinal direction of the leg portion. The diameter increases in the order of the small-diameter hole 124, the middle-diameter hole 122 and the large-diameter hole 142. The middle-diameter holes 122 may be disposed between the small-diameter holes 124. The number of the middle-diameter holes 122 and the small-diameter holes 124 may be appropriately adjusted as needed.

An insert molding 20 may be coupled to the suspension arm body 10.

The insert molding 20 may have a shape approximately similar to that of the suspension arm body 10. That is, the insert molding 20 may include two leg portions 22 and a joint portion 24 interconnecting the two leg portions 22. A large-diameter hole 242 may be formed through the joint portion 24.

An edge of the large-diameter hole 142 of the joint portion 14 is formed with a large-diameter coupling rim 244 which is enlarged in a thickness direction and a radial direction. The large-diameter coupling rim 244 is formed such that, when the insert molding 20 is injected, the large-diameter coupling rim 244 is disposed along a peripheral edge of the large-diameter hole 142 of the suspension arm body 10.

Thus, the large-diameter coupling rim 244 increases a coupling force between the suspension arm body 10 and the insert molding such that the insert molding 20 inserted into the suspension arm body 10 is not separated from the suspension arm body 10.

A plurality of buttons 224 may be formed in each of the leg portions 22 of the insert molding 20 at predetermined spacings along a longitudinal direction.

When the insert molding 20 is injected, the respective buttons 224 may be inserted into the small-diameter holes 124, which are formed in each leg portion 12 of the suspension arm body 10, to fill in the small-diameter holes 124. When injection-molding the insert molding, the respective buttons 224 may be formed to have a size radially enlarged up to peripheral edges of the small-diameter holes 124. The respective buttons 224 may increase the coupling force between the suspension arm body 10 and the insert molding 20.

Further, when the insert molding 20 is injected, a middle-diameter coupling rim 222, which is formed between the two buttons 224, may be formed to be radially enlarged up to a peripheral edge of each of the middle-diameter holes 122 formed in each leg portion 12 of the suspension arm body 10. Thus, the middle-diameter coupling rim 222 may increase the coupling force between the suspension arm body 10 and the insert molding 20.

Figure 3:
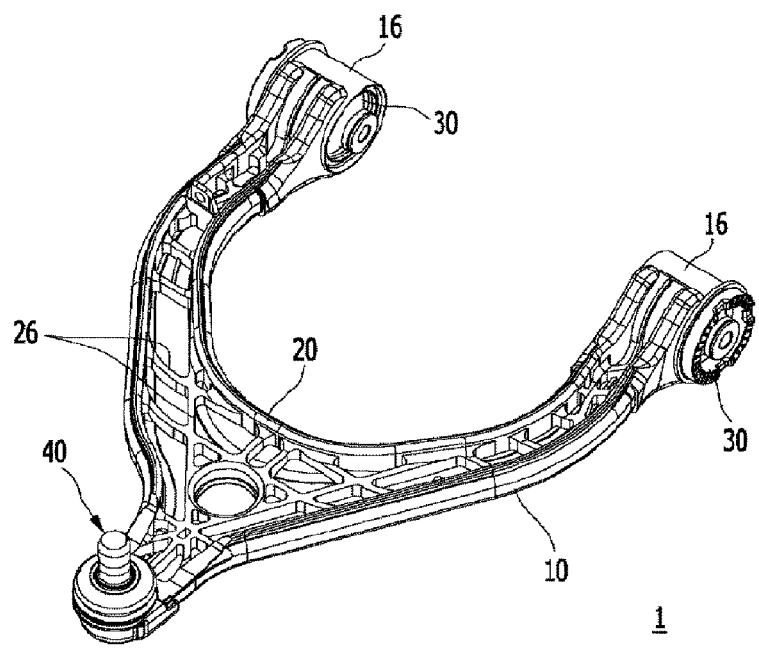
FIG. 3 is a rear view of the vehicular hybrid suspension arm manufactured by the manufacturing method according to one embodiment of the present disclosure.
Figure 4:
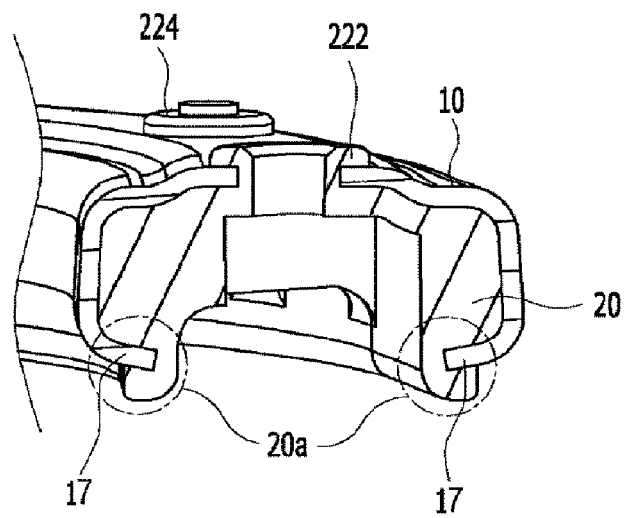
FIG. 4 is a sectional view taken along a line A-A in FIG. 1.

FIG. 3 is a rear view of the vehicular hybrid suspension arm 1 manufactured by the manufacturing method according to one embodiment, and FIG. 4 is a sectional view taken along a line A-A in FIG. 1.

One or more reinforcement ribs 26 having a generally lattice-patterned shape may be protrudingly formed in the insert molding 20 integrally with the insert molding 20. The shape of such reinforcement ribs 26 may be determined by using a computer optimum design program so that a weight of the insert molding 20 can be minimized.

Referring to FIG. 4, the suspension arm body 10 may include two coupling flanges 17 which are bent inward in a width direction of the suspension arm body. Each of the coupling flanges 17 may have a shape that is bent inward from a lateral distal end portion of each leg portion 12.

The two coupling flanges 17 are formed to face each other. When the insert molding 20 is injected, the coupling flanges 17 are inserted into the inside of the insert molding 20, i.e., the fixing portions 20a which are a portion of the insert molding 20, and to which the coupling flanges 17 are inserted.

According to the above-described structure, an upper surface, a lower surface and a side surface of the coupling flanges 17 are supported by the fixing portions 20a. Therefore, there is no possibility that a gap occurs between the insert molding 20 and the coupling flanges 17. Further, even if a crack occurs in the insert molding 20, it is very unlikely that the insert molding 20 is separated from the suspension arm body 10. Accordingly, the coupling force between the suspension arm body 10 and the insert molding 20 is increased.

FIG. 5 is a sectional view of the ball joint 40 of the vehicular hybrid suspension arm 1 according to one embodiment.

Referring to FIG. 5, as the insert molding 20 is injected in the state where the ball joint 40 is force-fitted into the ball joint pipe 18 of the suspension arm body 10, the ball joint 40 may be integrally coupled to the ball joint pipe 18 by the insert molding 20.

The insert molding 20 may surround the ball bearing 42 while also going between the ball bearing 42 and the ball joint pipe 18. After the insert molding solidifies, the insert molding 20 may firmly fix the ball bearing 42 to the ball joint pipe 18. The ball bearing 42 surrounds a spherical portion of the ball stud 41. The dust cover 43 surrounds a stick portion of the ball stud 41 such that dust does not enter the ball bearing 42.

Figure 6:
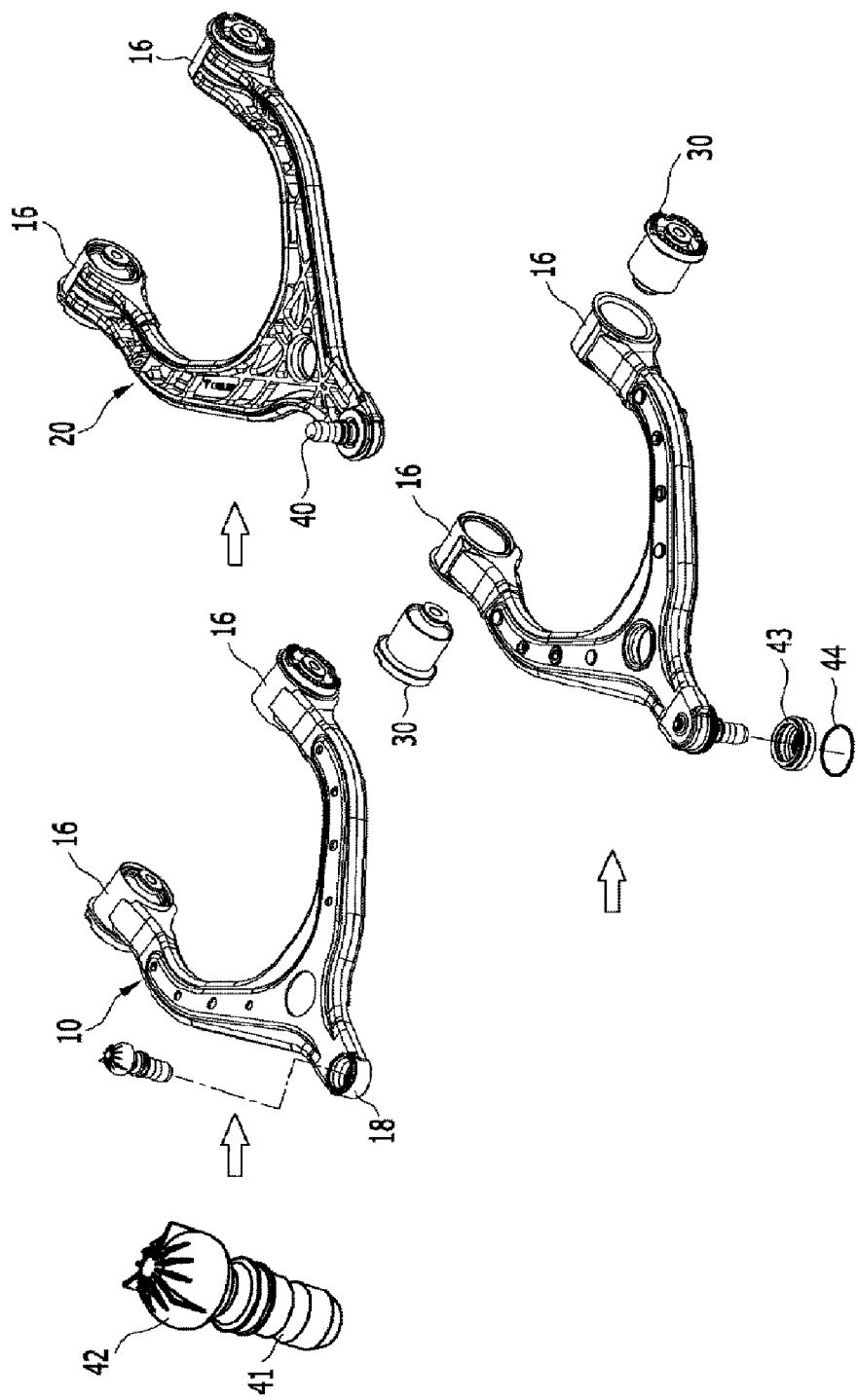
FIG. 6 is an assembly view showing fabrication procedures of a method of manufacturing a vehicular hybrid suspension arm according to one embodiment of the present disclosure.
Figure 7:
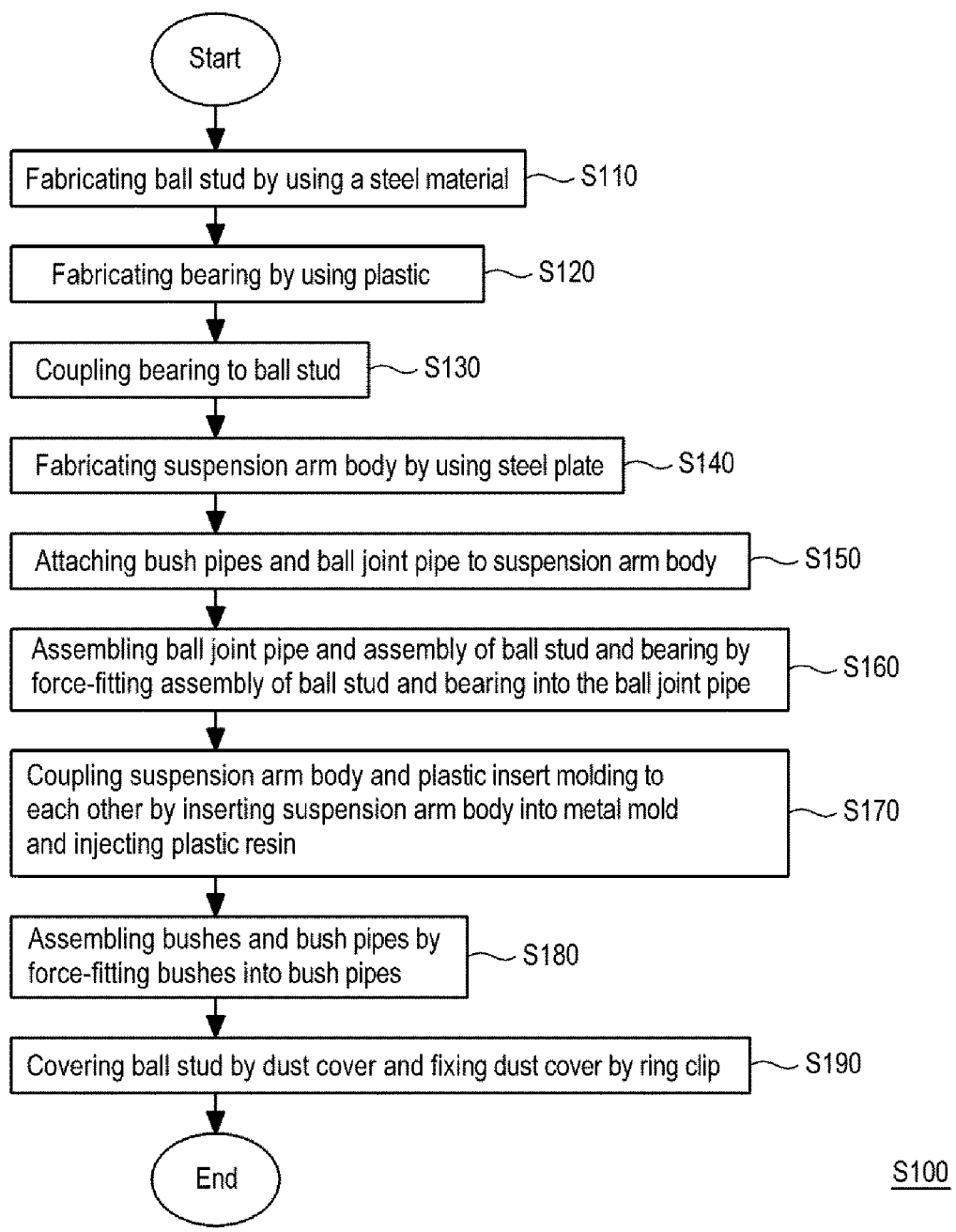
FIG. 7 is a flowchart of the method of manufacturing a vehicular hybrid suspension arm according to one embodiment of the present disclosure.

FIG. 6 is an assembly view showing fabrication procedures of a manufacturing method (S100) of the vehicular hybrid suspension arm 1 according to one embodiment. FIG. 7 is a flowchart of the manufacturing method (S100) of the vehicular hybrid suspension arm manufacturing method 1 according to one embodiment.

Referring to FIGS. 6 and 7, according to the vehicular hybrid suspension arm manufacturing method according to one embodiment, first, the ball stud 41 is fabricated by using a steel material (S110), and then the ball bearing 42 is fabricated by using plastic (S120), and thereafter the ball bearing 42 and the ball stud 41 are assembled by coupling the ball bearing 42 to the ball stud 42 (S130). At this time, to improve the performance of the ball bearing 42, lubricant may be injected between the ball bearing 42 and the ball stud 41.

Then, the suspension arm body 10 is fabricated by using a steel plate (S140), the pipes 16 and 18 are attached to the suspension arm body 10 by welding (S150), and the ball joint pipe 18 and the assembly of the ball stud 41 and the ball bearing 42 is assembled by force-fitting the assembly of the ball stud 41 and the ball bearing 42 into the ball joint pipe 18 (S160).

Subsequently, the suspension arm body 10 and the insert molding 20 are coupled to each other by inserting the suspension arm body 10 into a metal mold and injecting plastic resin (S170).

Then, the bush 30 and the bush pipe 16 are assembled by force-fitting the bush 30 into the bush pipe 16 (S180). The ball stud 41 is covered by the dust cover 43, and the dust cover 43 is fixed by the ring clip 44 (S190), thereby completing the fabrication process of the suspension arm.

Figure 8:
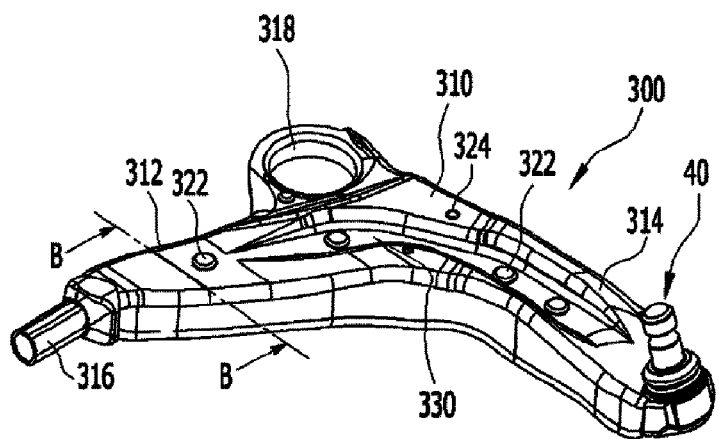
FIG. 8 is a perspective view of a vehicular hybrid suspension arm according to another embodiment of the present disclosure.
Figure 9:
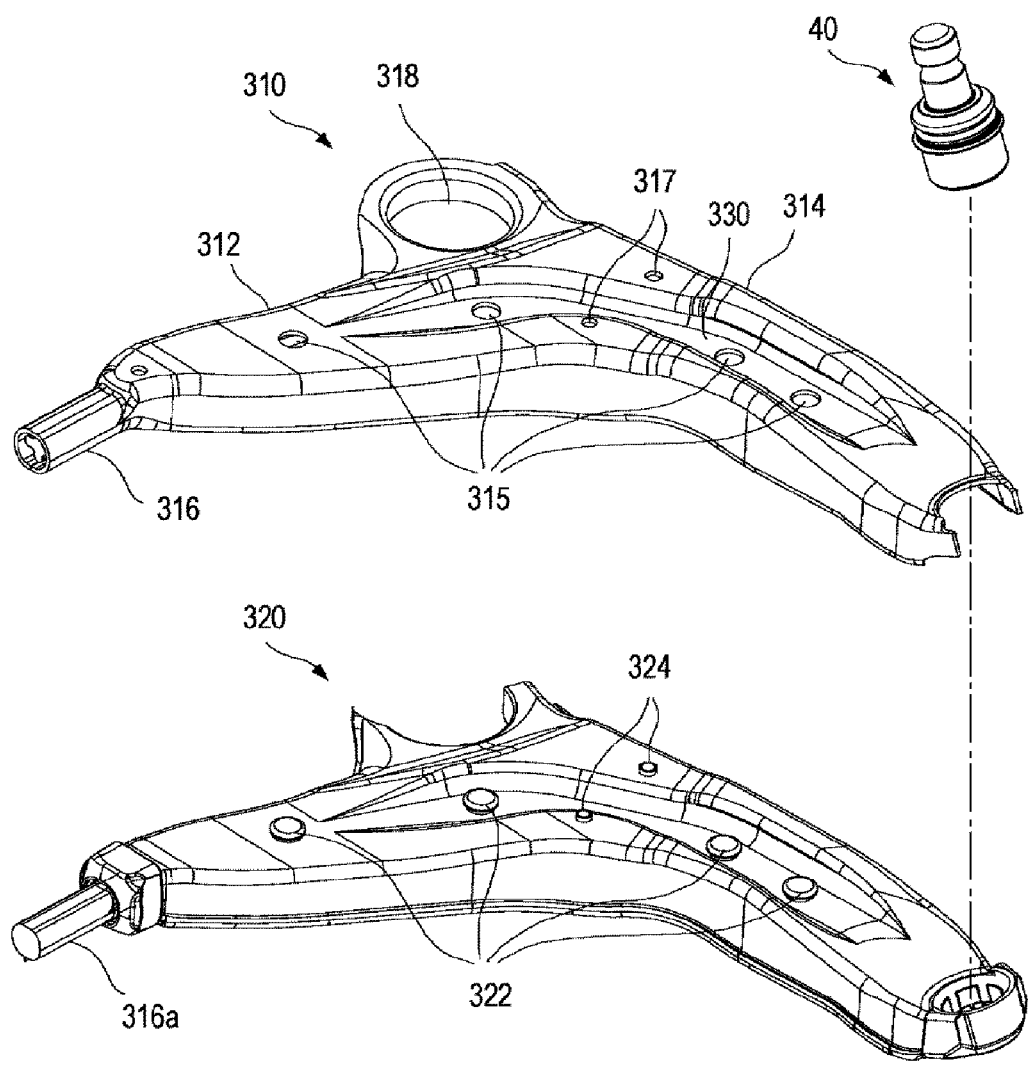
FIG. 9 is an exploded perspective view of the hybrid suspension arm shown in FIG. 8.
Figure 10:
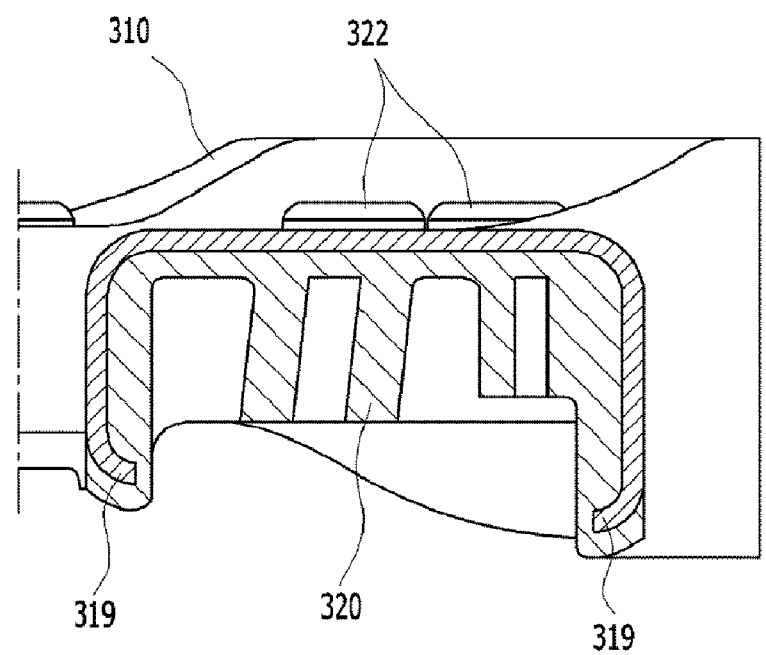
FIG. 10 is a sectional view taken along a line B-B in FIG. 8.

FIG. 8 is a perspective view of a vehicular hybrid suspension arm 300 according to another embodiment. FIG. 9 is an exploded perspective view of the vehicular hybrid suspension arm 300 shown in FIG. 8. FIG. 10 is a sectional view taken along a line B-B in FIG. 8 when the suspension arm is assembled.

Referring to FIGS. 8 to 10, the vehicular hybrid suspension arm 300 according to another embodiment may be applied to a lower control arm. The lower control arm may have, for example, a λ-like shape.

The vehicular hybrid suspension arm 300 may include a suspension arm body 310. The suspension arm body 310 may be fabricated from a high tensile steel plate for a vehicle through a press method. An insert molding 320 may be integrally coupled to the inside of the suspension arm body 310 by injection.

The suspension arm body 310 may include two leg portions 312, 314 which are integrally connected to each other. A bush coupling protrusion portion 316 having a pipe shape may be integrally formed with one of the leg portions 312. An insert molding 320 may be inserted into and coupled to the bush coupling protrusion portion 316. A bush (not shown) may be coupled to the bush coupling protrusion portion 316 and may be mounted on a vehicular body.

The bush coupling protrusion portion 316 may have a tubular shape with a hollow interior. The insert molding 320 may include a filling rod 316a that may be inserted into an empty space of the bush coupling protrusion portion 316. When the insert molding 320 is injected, the filling rod 316a may be formed while filling in the empty space of the bush coupling protrusion portion 316.

The empty space of the bush coupling protrusion portion 316 may be completely filled with the filling rod 316a. Therefore, when compared with a case where the bush coupling protrusion portion is made of only steel, the bush coupling protrusion 316 may be reduced in weight and may be improved in bending and torsional strength.

The insert molding 320 may be coupled to the other of the leg portions 314 by injection. A ball joint 40 may be inserted into a coupling leading end portion of the insert molding 320 of the other leg portion 314 and may be integrally coupled to the coupling end by injection.

A large-diameter hole 318 is formed in a central portion of the λ-shaped suspension arm body 310. The large diameter hole 318 may be disposed between the bush coupling protrusion portion 316 and the ball joint 40 and may be formed on one side surface of the suspension arm body 310. A bush (not shown) may be force-fitted into and coupled to the large-diameter hole 318.

To increase the coupling performance between the suspension arm body 310 and the insert molding 320, one or more middle-diameter holes 315 may be formed in the suspension arm body 310. Further, one or more buttons 322 may be formed in the insert molding 320 in such a manner that the buttons 322 fill in the middle-diameter holes 315 and are radially enlarged up to peripheral edges of the middle-diameter holes 315.

One or more small-diameter holes 317 may be formed in the suspension arm body 310 and one or more small-diameter coupling rims 324 may be formed in the insert molding 320 so as to be radially enlarged up to peripheral edges of the small-diameter holes 317.

The suspension arm body 310 may be formed with a recess portion 330 which is recessed throughout upper surfaces of the two leg portions 312, 314. The recess portion 330 may be formed in a separate form on the upper surfaces of the two leg portions 312, 314, or may be formed on only one leg portion. The recess portion 330 may increase the rigidity of the suspension arm body 310 itself. Further, at least one small-diameter hole 317 may be formed in the recess portion 330.

The insert molding 320 is inserted between a portion bent by the recess portion 330 and the side surfaces of the two leg portions 312, 314. During a cooling process, the insert molding 320 is contracted, and the insert molding 320 may exert a force which tightens the above-mentioned bent portion. Therefore, the coupling force between the insert molding 320 and the suspension arm body 310 can increase.

The above-described structure related to the recess portion 330 may also be applied to the hybrid suspension arm 1 described above and a hybrid suspension arm 400 to be described below.

Referring to FIG. 10, the suspension arm body 310 may be formed with two coupling flanges 319 which are bent inward in a width direction of the suspension arm body. The two coupling flanges 319 may be formed to face each other. Thus, when the insert molding 320 is injected, the two coupling flanges 319 may be inserted into the insert molding 320 in such a manner that the two coupling flanges are stuck into the inside of the insert molding. Therefore, the coupling force between the suspension arm body 310 and the insert molding 320 can be increased.

Figure 11:
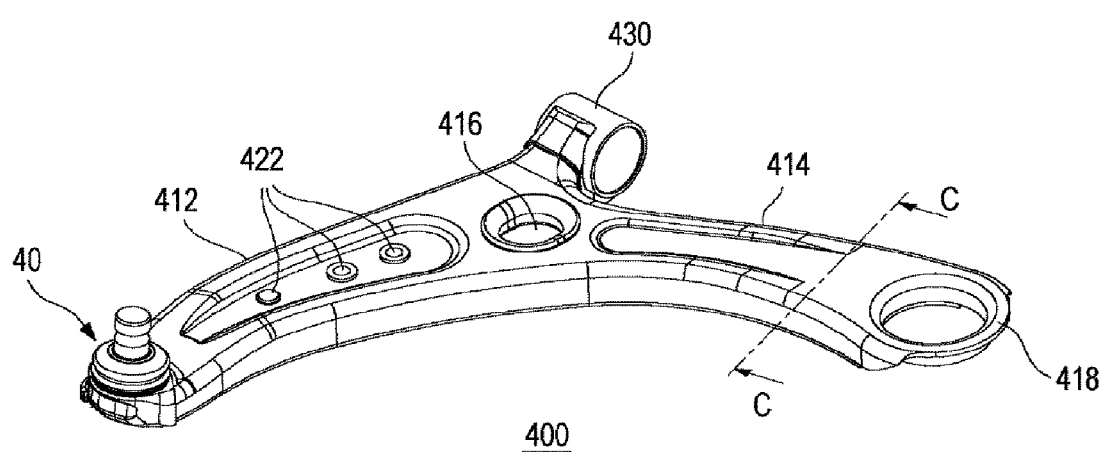
FIG. 11 is a perspective view of a vehicular hybrid suspension arm according to a further embodiment of the present disclosure.
Figure 12:
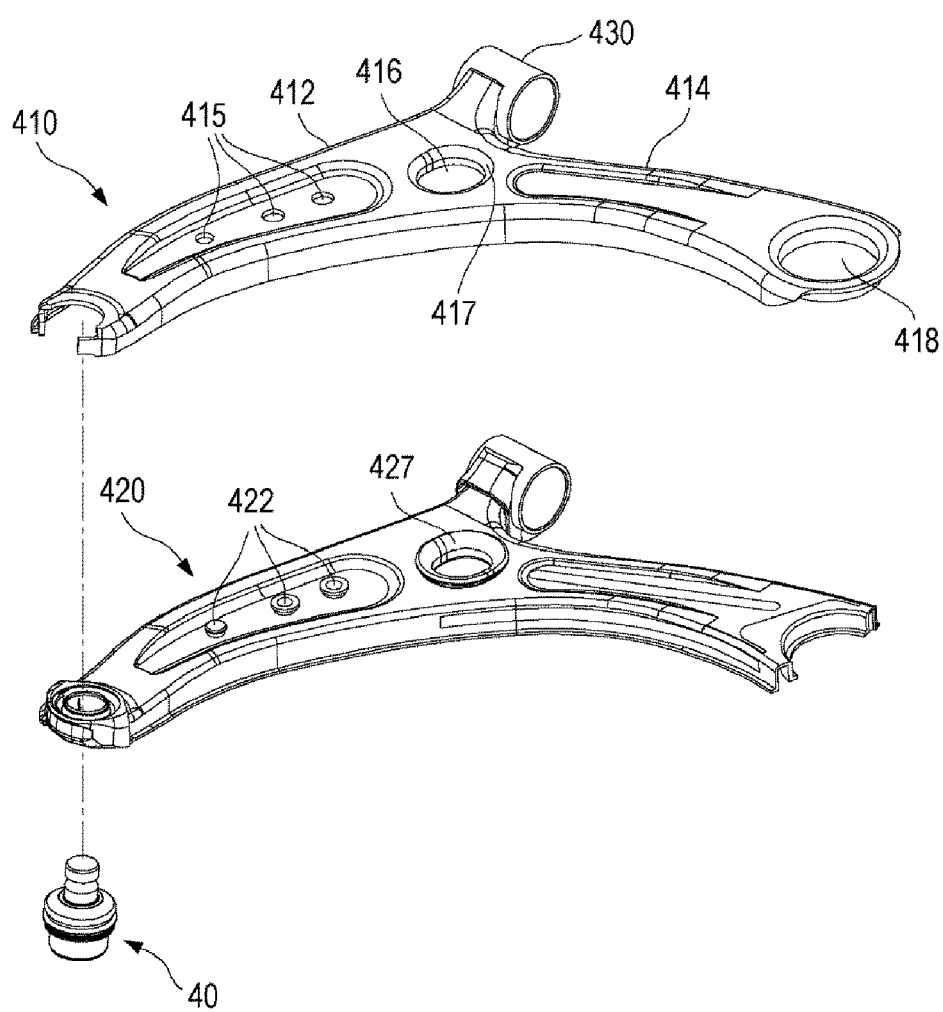
FIG. 12 is an exploded perspective view of the vehicular hybrid suspension arm shown in FIG. 11.
Figure 13:
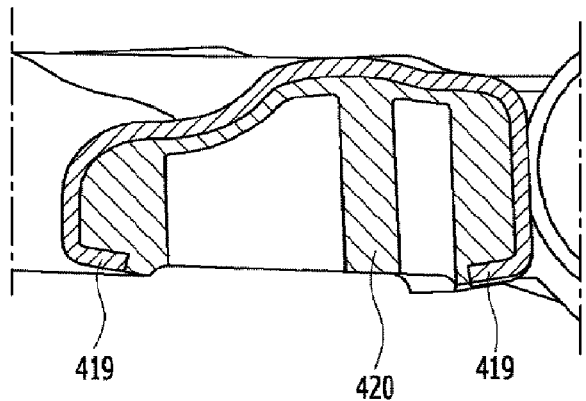
FIG. 13 is a sectional view taken along a line C-C in FIG. 11.

FIG. 11 is a perspective view of a vehicular hybrid suspension arm 400 according to a further embodiment. FIG. 12 is an exploded perspective view of the vehicular hybrid suspension arm 400 shown in FIG. 11. FIG. 13 is a sectional view taken along a line C-C in FIG. 11.

Referring to FIG. 11, the vehicular hybrid suspension arm 400 according to a further embodiment may be applied to a lower control arm.

The vehicular hybrid suspension arm 400 may include a suspension arm body 410 and an insert molding 420. The suspension arm body 410 can be fabricated from a high tensile steel plate for a vehicle through a press method. The insert molding 420 may be formed in the inner side of the suspension arm body 410 by injection and may be integrally coupled to the suspension arm body 410.

The suspension arm body 410 may include two leg portions 412, 414. The insert molding 420 may be coupled to one leg portion 412 by injection. The ball joint 40 may be inserted into a coupling leading end portion of the insert molding 420 and may be integrally coupled to the coupling end by injection. A large-diameter bush coupling hole 418 is formed in a leading end portion of the other leg portion 414. A bush (not shown) may be force-fitted into and coupled to the large-diameter bush coupling hole 418.

A bush pipe 430 may be integrally coupled to a corner where the two leg portions 412, 414 meet. Substantially, the bush pipe 430 may be disposed between the ball joint 40 and the large-diameter bush coupling hole 418.

To increase the coupling performance between the suspension arm body 410 and the insert molding 420, a middle-diameter hole 416 may be formed in an upper surface of the suspension arm body 410, and the middle-diameter hole 416 may be located adjacent to a middle section when an entire length of the suspension arm body is trisected. A middle-diameter hole flange 417, which is bent toward the inside of the insert molding 420, may be formed in the upper surface of the suspension arm body 410.

The insert molding 420 may include a flange cover portion 427 which surrounds such a middle-diameter hole flange 417. When the insert molding 420 is injected, the flange cover portion 427 may be enlarged from an end of the middle-diameter hole flange 417 until the flange cover portion covers a portion of the upper portion of the suspension arm body 410. Thus, the flange cover portion 427 surrounds the middle-diameter hole flange 417, thereby increasing the coupling performance between the insert molding 420 and the suspension arm body 410.

Further, to increase the coupling performance between the suspension arm body 410 and the insert molding 420, one or more small-diameter holes 415 may be formed through the two leg portions 412, 414. One or more buttons 422 may be formed in the insert molding 420 in such a manner that the buttons fill in one or more small-diameter holes 415 and are radially enlarged up to peripheral edges of the small-diameter holes 415.

As shown in FIG. 13, two coupling flanges 419, which are bent inward in a width direction of the suspension arm body 410, may be formed in the suspension arm body 410. The two coupling flanges 419 may be formed to face each other. When the insert molding 20 is injected, the two coupling flanges 419 may be inserted into the insert molding 420 in such a manner that the two coupling flanges 419 are stuck into the inside of the insert molding 420, thereby increasing the coupling force between the suspension arm body 410 and the insert molding 420.

To prevent separation between the suspension arm body and the insert molding, the above-described vehicular hybrid suspension arm 1, 300, 400 may include a coupling portion in which the suspension arm body and a portion of the insert molding intersect with each other.

For example, the coupling portion may include a flange structure, a button structure, a reinforcement structure (see FIGS. 14 to 19), or the like. However, the coupling portion is not limited to the aforementioned structure. Any structure may be applied as long as it is capable of increasing the coupling force between the suspension arm body and the insert molding.

The flange structure, the button structure and the reinforcement structure may be overlappingly applied to the vehicular hybrid suspension arm 1, 300, 400. That is, there may be provided an embodiment of the vehicular hybrid suspension arm 1, 300, 400 to which the flange structure and the button structure are applied, an embodiment of the vehicular hybrid suspension arm 1, 300, 400 to which the flange structure and the reinforcement structure are applied, an embodiment of the vehicular hybrid suspension arm 1, 300, 400 to which the button structure and the reinforcement structure are applied, or an embodiment of the vehicular hybrid suspension arm 1, 300, 400 to which all of the flange structure, the button structure and the reinforcement structure are applied.

Detailed descriptions have been made as to the flange structure including the coupling flanges 17, 319, 419 and the button structure including the buttons 224, 322, 422 with reference to FIGS. 1 to 13. Hereinafter, descriptions are made as to the reinforcement structure with reference to FIGS. 14 to 19.

Figure 14:
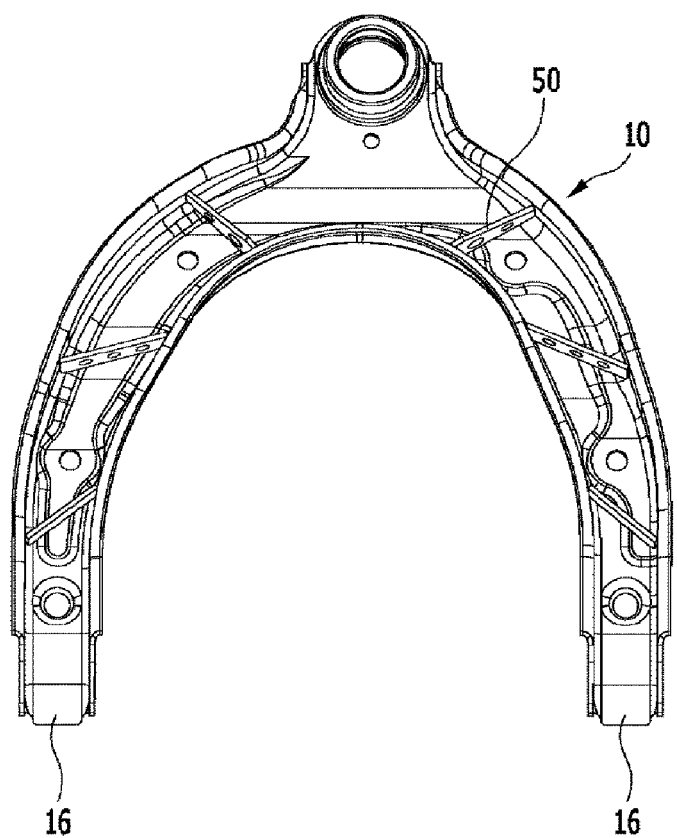
FIG. 14 is a bottom view of a suspension arm body provided with a reinforcement member according to the present disclosure.
Figure 15:
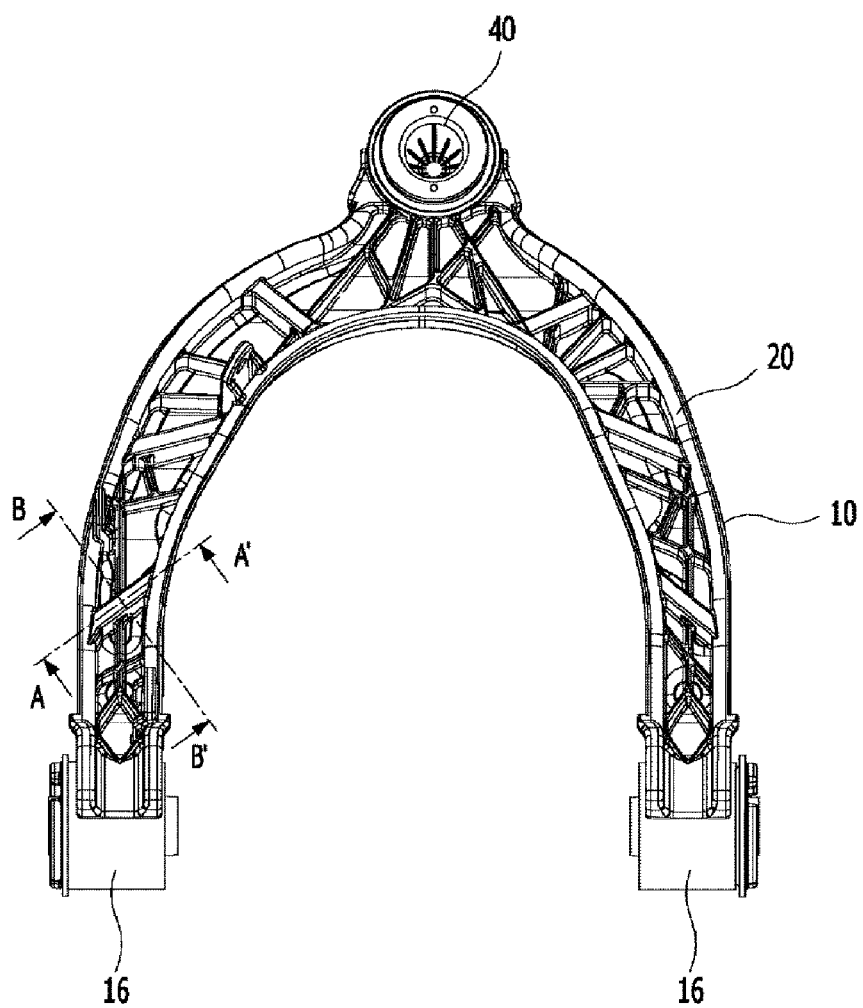
FIG. 15 is a bottom view of a vehicular hybrid suspension arm provided with a reinforcement member according to the present disclosure.
Figure 16:
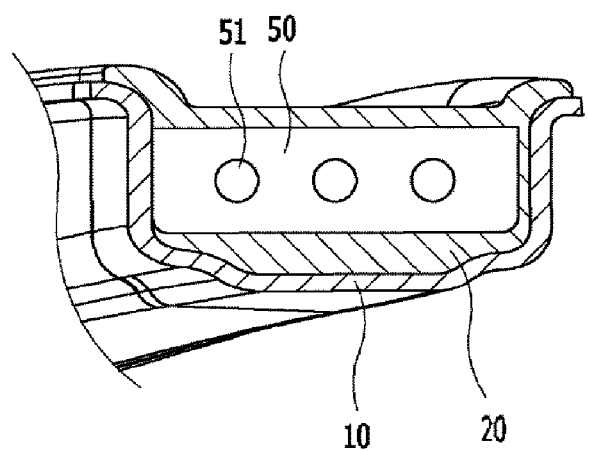
FIG. 16 is a sectional view taken along a line A-A' in FIG. 15.
Figure 17:
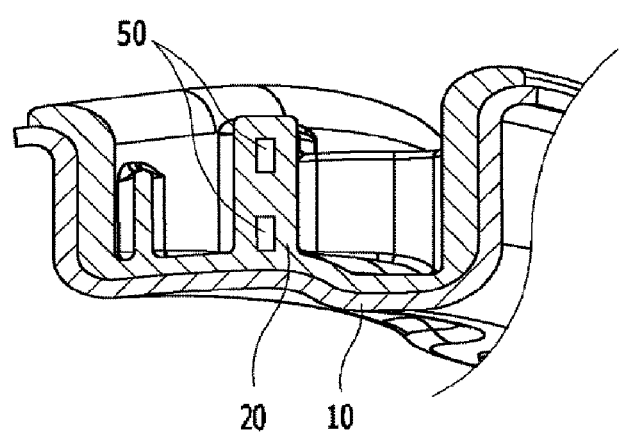
FIG. 17 is a sectional view taken along a line B-B' in FIG. 15.

FIG. 14 is a bottom view of the suspension arm body 10 provided with a reinforcement member 50. FIG. 15 is a bottom view of the vehicular hybrid suspension arm 1 provided with the reinforcement member 50. FIG. 16 is a sectional view taken along a line A-A' in FIG. 15, and FIG. 17 is a sectional view taken along a line B-B' in FIG. 15. The suspension arm body 10 shown in FIGS. 14 to 17 may have the same shape as the upper arm shown in FIG. 2.

Referring to FIGS. 14 and 15, at least one reinforcement member 50 may be inserted into a C-shaped space formed by the suspension arm body 10 and may be welded and coupled to both inner side surfaces of the suspension arm body 10.

The reinforcement member 50 may be made of the same metal material as the suspension arm body 10 and may be made of, for example, a steel material. Further, to reduce the weight of the reinforcement member 50, the reinforcement member 50 may be made of aluminum.

The reinforcement member 50 may have a plate shape. At least a portion of the reinforcement member 50 may be embedded by the insert molding 20. The insert molding 20 may surround the reinforcement member 50.

The reinforcement member 50 may be disposed in a cross-sectional direction of the leg portion of the suspension arm body 10. For example, three reinforcement members 50 may be provided for each leg. The reinforcement members 50 may be provided not only in a direction perpendicular to the longitudinal direction of the leg portion, but also in a direction oblique to the longitudinal direction of the leg portion.

Referring to FIG. 16, an upper end of the reinforcement member 50 may not be coupled to an inner upper surface of the suspension arm body 10. A space having a certain size may be provided between the upper end of the reinforcement member 50 and the inner upper surface of the suspension arm body 10. The insert molding 20 may extend between the inner upper surface of the suspension arm body 10 and the upper surface of the reinforcement member 50.

At least one hole 51 may be formed in the reinforcement member 50. The insert molding 20 may extend through the hole 51.

Referring to FIG. 17, it can be ascertained that the reinforcement member 50 is inserted into the inside of insert molding 20 due to the formation of the hole 51. Thus, the insert molding 20 and the reinforcement member 50 may be disposed so as to intersect with each other. Therefore, the overall rigidity of the reinforcement member 50 and the hybrid arm 1 can be increased, and the coupling force between the suspension arm body 10 and the insert molding 20 can be increased.

Figure 18:
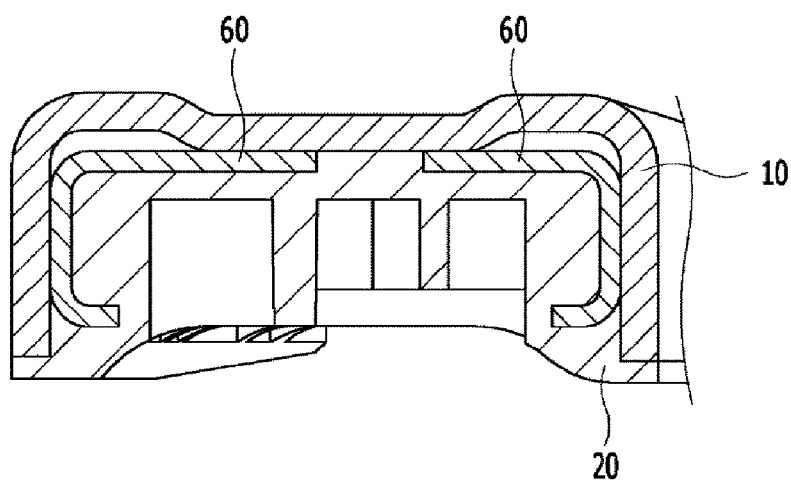
FIG. 18 is a sectional view of a vehicular hybrid suspension arm provided with another reinforcement member according to the present disclosure.

FIG. 18 is a sectional view of the vehicular hybrid suspension arm 1 provided with another reinforcement member 60.

The reinforcement member 60 may have a configuration separated into two pieces, and may have a shape similar to the leg portion of the suspension arm body 10 as a whole. The reinforcement member 60 may include at least two plates connected to each other, and at least a part of the reinforcement member 60 may have a bent shape.

The reinforcement member 60 may be disposed along the longitudinal direction of the leg portion. That is, the reinforcement member 60 may have a configuration similar to a configuration in which the leg portions of the suspension arm body 10 are disposed doubly.

An upper surface and a side surface of the reinforcement member 60 may be disposed in a direction parallel to the upper surface and the side surface of the suspension arm body 10. Unlike the reinforcement member 50, the upper surface of the reinforcement member 60 may be coupled to the inner upper surface of the suspension arm body 10 by welding, and the insert molding may be inserted into a space between the upper surfaces of the separate pieces of the reinforcement member 60.

Further, unlike the reinforcement member 50, the upper surface of the reinforcement member 60 may be spaced such that a space exists between the upper surface of the reinforcement member 60 and the inner upper surface of the suspension arm body 10. Therefore, the insert molding may not be inserted into such a space.

The reinforcement member 60 may have the aforementioned flange structure in order to increase the coupling force with the insert molding 20. Thus, a lower distal end of the reinforcement member 60 may be formed to be bent inward in a width direction of the reinforcement member 60. Further, unlike the reinforcement member 60, the end portion of the suspension arm body 10 may not be formed to be bent inward in the width direction.

Figure 19:
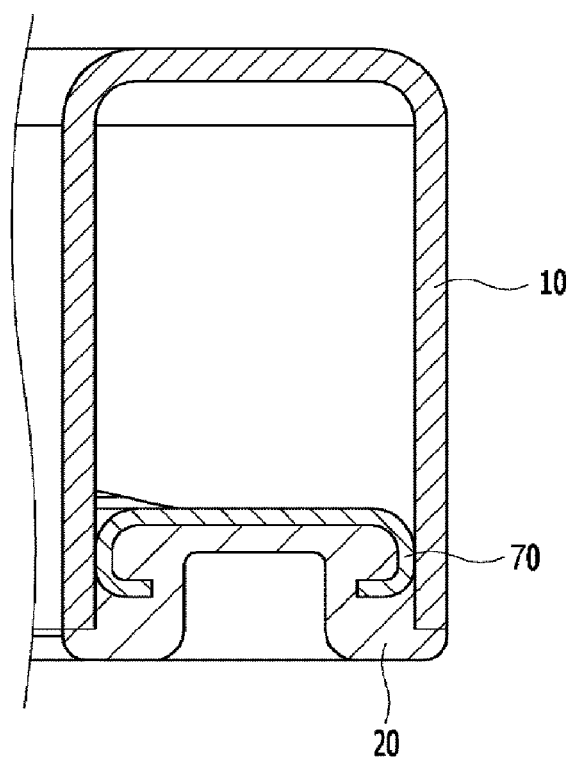
FIG. 19 is a sectional view of a vehicular hybrid suspension arm provided with a further reinforcement member according to the present disclosure.

FIG. 19 is a sectional view of the vehicular hybrid suspension arm 1 provided with a further reinforcement member 70.

Unlike the reinforcement member 60, the reinforcement member 70 may have a one-piece structure without being divided into two pieces. The inner upper surface of the suspension arm body 10 and an upper surface of the reinforcement member 70 may be spaced apart from each other by a predetermined distance, forming a space therebetween. The insert molding 20 is not inserted into such a space. Thus, the cross section of the suspension arm body 10 may have a quadrilateral cross-sectional structure, and the rigidity of the suspension arm body 10 can be increased.

The reinforcement member 70 may have a flange structure to improve the coupling force with the insert molding 20. Thus, a lower distal end of the reinforcement member 70 may be formed to be bent inward in a width direction of the reinforcement member 70. Further, unlike the reinforcement member 70, the end portion of the suspension arm body 10 may not be formed to be bent inward in the width direction.

In case where the above-described reinforcement member 60 and the above-described reinforcement member 70 are disposed in the hybrid suspension arm 300, 400 shown in FIGS. 8 to 13, the reinforcement member 60, 70 may be disposed to extend over a portion of one of the two leg portions and a portion of the other of the two leg portions.

Hereinafter, descriptions are made as to a configuration for improving a contact ratio between the ball stud 41 and the ball bearing 42 in the ball joint 40 shown in FIGS. 1 and 5.

Figure 20:
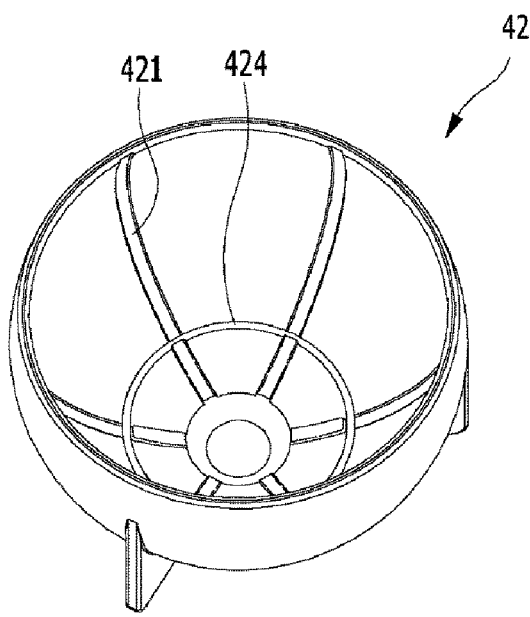
FIG. 20 is a perspective view showing a configuration in which grooves are applied to the ball bearing of FIG. 5.

FIG. 20 is a perspective view showing a configuration in which grooves 421, 424 are applied to the ball bearing 42 shown in FIG. 5. A longitudinal groove 421 or a transverse groove 424 may be formed on an inner spherical surface of the ball bearing 42.

Due to the presence of such a groove 421, 424, lubricant or grease fills in the groove 421, 424, and thus, when the ball stud 41 moves, such grease can better distribute on the spherical surface of the ball of the ball stud 41. Therefore, the ball portion of the ball stud 41 and the inner spherical surface of the ball bearing 42 can be brought into more smooth contact with each other.

Figure 21:
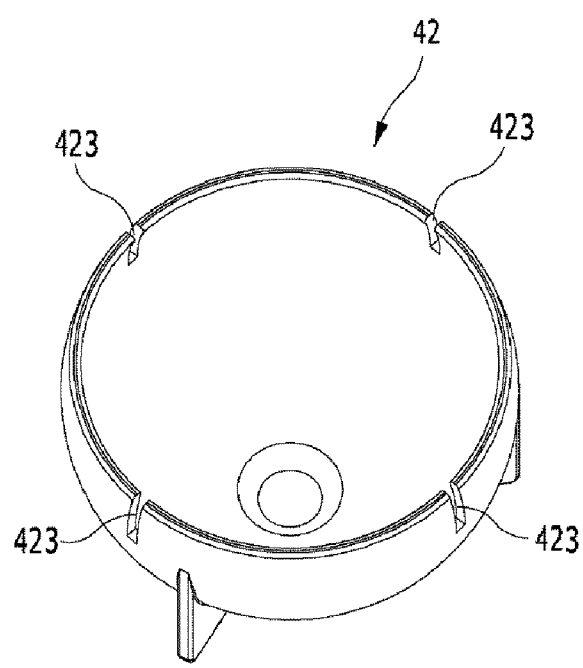
FIG. 21 is a perspective view showing a configuration in which slots are applied to the ball bearing of FIG. 5.

FIG. 21 is a perspective view showing a configuration in which slots 423 are applied to the ball bearing 42 shown in FIG. 5.

The slots 423 may be disposed along an upper cutting line of the ball bearing 42. The slots 423 can reduce the pressure applied to the inner spherical surface of the ball bearing 42 in a movement direction of the ball stud 41 during the movement of the ball stud 41, thereby improving the overall contact ratio between the ball bearing 42 and the ball stud 41.

Figure 22:
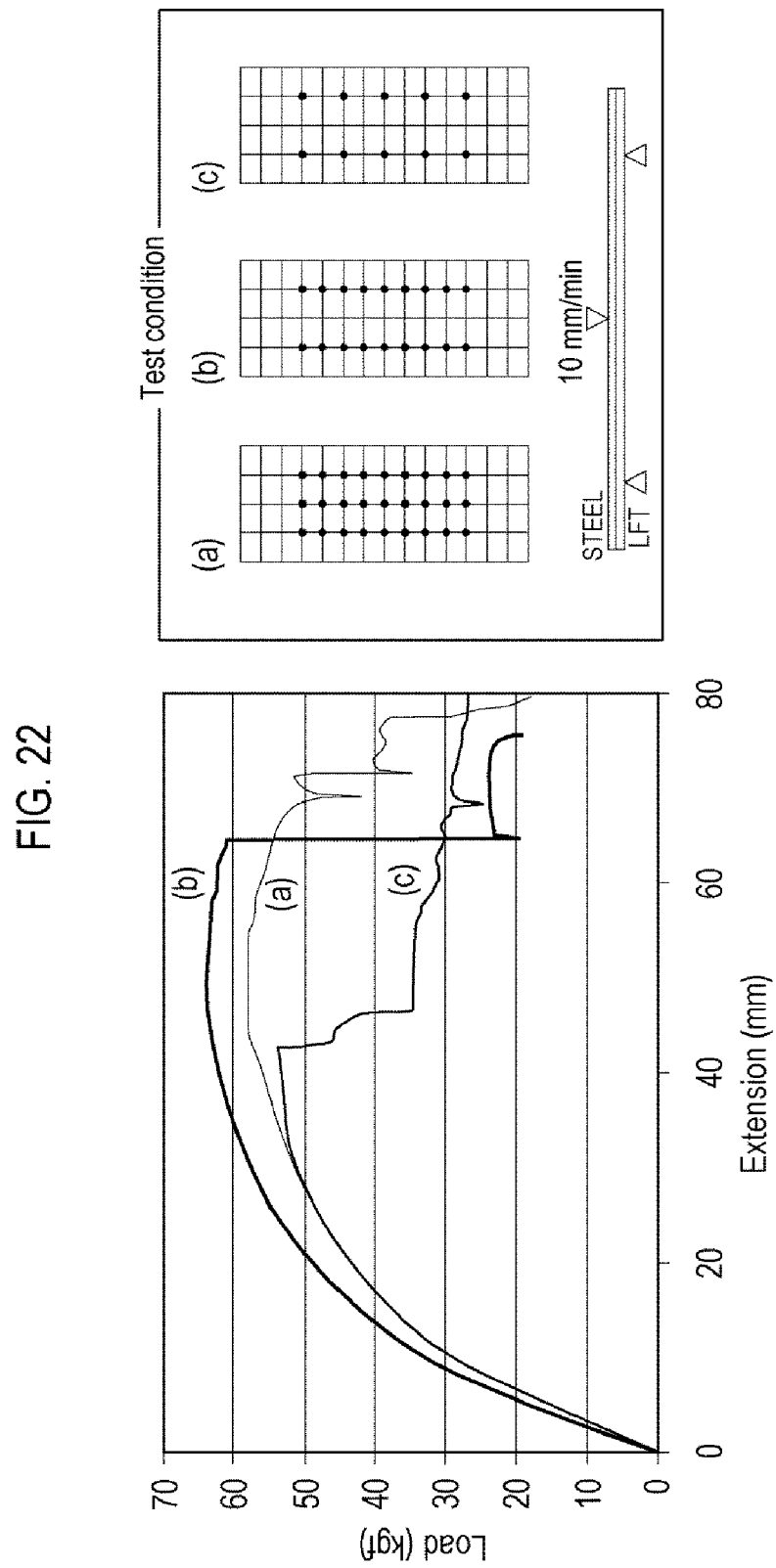
FIG. 22 shows experimental results for determining the optimal number of buttons which are applied to the vehicular hybrid suspension arms according to various embodiments of the present disclosure.

FIG. 22 shows experimental data for selecting an appropriate number of the holes which are formed in the vehicular hybrid suspension arms 1, 300, 400 according to various embodiments.

It is necessary to select an appropriate number of the small-diameter holes or the middle-diameter holes in the above-described vehicular hybrid suspension arms 1, 300, 400. In contrast, as for the large-diameter hole, only one large-diameter hole exits, and therefore, it is unnecessary to select the number of the large-diameter hole.

In the test conditions shown at the right side, case (a) corresponds to the case where the number of the holes is largest, case (b) has the number of the holes smaller than case (a), and case (c) corresponds to the case where the number of the holes is smallest.

Referring to the graph shown at the left side, the more the number of the buttons is, the more the bonding effect with the insert molding and the strength reinforcement effect can be improved. However, in case the buttons exist beyond the number within an appropriate range, the strength reinforcement effect may be reduced. Accordingly, it can be ascertained that the unconditionally large number of the buttons does not guarantee the maximum synergistic effect.

In the case of the U-shaped vehicular hybrid suspension arm 1 used as an upper control arm, it is preferable that two to four middle-diameter holes 122 and two to four small-diameter holes 124 are disposed in each leg as shown in FIG. 2.

Further, in the case of the λ-shaped hybrid suspension arm 300, 400 used as a lower control arm, it is preferable that two to four buttons are disposed in each leg. Specifically, it is preferable that two to four buttons are disposed in the long leg where the large-diameter hole is formed, and that one to three buttons are disposed in the short leg where the ball joint is provided.

The technical idea of the present disclosure has been described heretofore with reference to some embodiments and examples shown in the accompanying drawings. However, it is to be understood that various substitutions, modifications and alterations may be made without departing from the technical idea and scope of the present disclosure that can be understood by those of ordinary skill in the technical field to which the present disclosure pertains. Further, it is to be understood that such substitutions, modifications and alterations fall within the appended claims.

What is claimed is:

1. A vehicular hybrid suspension arm, comprising:
a suspension arm body made of a steel material and having an upper wall and two side walls;
at least one reinforcement member made of a metal material and having an upper wall and two side walls; and
an insert molding inserted into and coupled to the suspension arm body,
the upper wall of the reinforcement member is spaced apart from the upper wall of the suspension arm body to form a closed box sectional structure between the suspension arm body and the reinforcement member, and
at least a portion of the reinforcement member is in contact with the insert molding.

2. The vehicular hybrid suspension arm of claim 1, wherein distal ends of the reinforcement member are formed to be bent inward in a width direction of the reinforcement member.

3. The vehicular hybrid suspension arm of claim 1, wherein the suspension arm body has two leg portions and the reinforcement member is disposed to extend over at least a portion of the two leg portions.

4. The vehicular hybrid suspension arm of claim 1, further comprising a flange structure that includes:
a coupling flange formed to be bent inward in a width direction of the suspension arm body; and
a fixing portion which is a portion of the insert molding and into which the coupling flange is inserted.

5. The vehicular hybrid suspension arm of claim 1, further comprising a button structure that includes:
one or more holes formed in the suspension arm body; and
one or more buttons which are formed from the insert molding and are inserted into and fill in the one or more holes.

6. The vehicular hybrid suspension arm of claim 1, wherein the insert molding includes a at least one reinforcement rib formed in at least a portion of the suspension arm.

7. A vehicular hybrid suspension arm, comprising:
a suspension arm body made of a steel material and having an upper wall and two side walls;
at least one reinforcement member made of metal material and installed in the suspension arm body; and
an insert molding inserted into the suspension arm body, wherein
the reinforcement member coupled to the suspension arm body such that side ends of the reinforcement member are fixed to the side walls of the suspension arm body,
an upper end of the reinforcement member is spaced apart from the upper wall of the suspension arm body to form a space between the upper end of the reinforcement member and the upper wall of the suspension arm body,
a portion of the insert molding is filled in the space between the upper end of the reinforcement member and the upper wall of the suspension arm body, and
the reinforcement member is embedded by the insert molding such that all surfaces of the reinforcement member, except for the side ends, are surrounded by the insert molding.

8. The vehicular hybrid suspension arm of claim 7, wherein the reinforcement members are disposed in a direction parallel to a cross-sectional direction of the suspension arm body.

9. The vehicular hybrid suspension arm of claim 7, wherein the reinforcement member has a plate shape.

10. The vehicular hybrid suspension arm of claim 7, wherein at least one hole is formed in the reinforcement member.

11. The vehicular hybrid suspension arm of claim 7, further comprising a flange structure that includes:
a coupling flange formed to be bent inward in a width direction of the suspension arm body; and
a fixing portion which is a portion of the insert molding and into which the coupling flange is inserted.

12. The vehicular hybrid suspension arm of claim 7, further comprising a button structure that includes:
one or more holes formed in the suspension arm body; and
one or more buttons which are formed from teh insert molding and are inserted into a fill in the one or more holes.

13. The vehicular hybrid suspension arm of claim 7, wherein the insert molding includes a at least one reinforcement rib formed in at least a portion of the suspension arm.

* * * * *